(12) United States Patent
Liang et al.

(10) Patent No.: US 9,544,357 B2
(45) Date of Patent: Jan. 10, 2017

(54) CLOUD-STORAGE-BASED FILE PROCESSING METHOD AND SYSTEM

(71) Applicant: GUANGZHOU UCWEB COMPUTER TECHNOLOGY CO., LTD, Guangzhou (CN)

(72) Inventors: Jie Liang, Guangzhou (CN); Chuanli Fu, Guangzhou (CN); Ronghai Huang, Guangzhou (CN)

(73) Assignee: GUANGZHOU UCWEB COMPUTER TECHNOLOGY CO., LTD, Guangzhou (CN)

(*) Notice: Subject to any disclaimer, the term of this patent is extended or adjusted under 35 U.S.C. 154(b) by 0 days.

(21) Appl. No.: 14/249,559

(22) Filed: Apr. 10, 2014

(65) Prior Publication Data

US 2014/0344892 A1   Nov. 20, 2014

Related U.S. Application Data

(63) Continuation of application No. PCT/CN2013/074912, filed on Apr. 27, 2013.

(30) Foreign Application Priority Data

Apr. 28, 2012   (CN) .......................... 2012 1 0132174

(51) Int. Cl.
*H04L 29/08* (2006.01)
*G06F 17/30* (2006.01)
(Continued)

(52) U.S. Cl.
CPC ......... *H04L 67/06* (2013.01); *G06F 17/30194* (2013.01); *H04L 63/08* (2013.01);
(Continued)

(58) Field of Classification Search
CPC ....................................................... H04L 63/08
See application file for complete search history.

(56) References Cited

U.S. PATENT DOCUMENTS 7,814,483 B2 * 10/2010 Li ....................... H04L 67/2847
717/177
7,937,589 B2 * 5/2011 Oswald et al. ............... 713/182
(Continued)

FOREIGN PATENT DOCUMENTS

CN    101815084 A    8/2010
CN    102355493 A    2/2012

*Primary Examiner* — Teshome Hailu
*Assistant Examiner* — Thanh Le
(74) *Attorney, Agent, or Firm* — Anova Law Group, PLLC

(57) ABSTRACT

The present invention provides a cloud-storage-based file processing method and system. The method includes: a cloud server receiving a trigger request from a mobile terminal and the trigger request is a cloud processing task request triggered by the mobile terminal; the cloud server performing a corresponding processing operation according to the trigger request; and, when the trigger request is an uploading request, selecting a file which needs to be uploaded from the cloud server's cloud storage space and transferring the selected file to a target website. According to the present invention, by using the cloud server on behalf of a user to carry out the file processing operations, such as downloading and uploading, it helps the user completing the online file sharing process, prevents the file uploading and downloading processes from being affected by the network access condition and the mobile terminal's hardware quality, and saves the user the data volume of the mobile terminal throughout the process.

15 Claims, 2 Drawing Sheets

(51) Int. Cl.
*H04L 29/06* (2006.01)
*H04W 4/00* (2009.01)
(52) U.S. Cl.
CPC ......... *H04L 67/2861* (2013.01); *H04L 67/02* (2013.01); *H04W 4/00* (2013.01)

(56) References Cited

U.S. PATENT DOCUMENTS

| | | | |
|---|---|---|---|
| 8,813,249 B2 * | 8/2014 | Gu .................................. | 726/28 |
| 2003/0163551 A1 | 8/2003 | Riordan | |
| 2012/0072566 A1 * | 3/2012 | Cho ...................... | G06F 9/5072 |
| | | | 709/223 |
| 2012/0203733 A1 * | 8/2012 | Zhang .................... | G06Q 50/01 |
| | | | 707/600 |
| 2012/0331108 A1 * | 12/2012 | Ferdowsi et al. ............. | 709/219 |
| 2013/0013745 A1 * | 1/2013 | Whittick et al. .............. | 709/219 |

* cited by examiner

CLOUD-STORAGE-BASED FILE PROCESSING METHOD AND SYSTEM

FIELD OF THE INVENTION

The present invention generally relates to mobile communication field and, more particularly, to a cloud-storage-based file processing method and system.

BACKGROUND

With the development and progress of society and technology, people are becoming more and more used to access information through wireless access terminal, and most commonly, browsing the Internet using mobile terminals. Downloading resources and uploading files are the most frequently-performed on-line file operations. According to individual requirements on work and entertainment, etc., users frequently download/upload various resources, such as documents, movies, stories, MP3, software-applications, etc., make/reply posting in online forums, insert attachment when sending/replying emails, or publish information by inserting uploaded files or pictures in web blogs. Because of its convenience and flexibility to browse the Internet at anytime and anywhere, mobile terminals become the most popular and widely accepted way to browse the Internet.

With existing technologies, when a user comes across a file or a picture online and wants to share it with other people by web posts, emails or blogs, the most common way is to download the file to the user's mobile terminal itself, then upload the locally stored file from the user's mobile terminal to the website by publishing posts on Internet forum websites, sending emails or writing blogs. Such process is restricted by the user's current network access speed and the device's quality level. For example: when connected in a GPRS link, it takes longer time to download a slightly larger file. As for those low-end mobile terminals, they often have smaller storage space, limiting file downloading.

When a user browses the Internet by a mobile terminal, the user not only cares about the browsing speed and the convenience of the mobile terminal, but also cares about the data volume of the mobile terminal. When a webpage is downloaded from the Internet to the user's mobile terminal itself and then uploaded back again to a website, it consumes at least twice the data volume of the mobile terminal. If the user wants to share the file in multiple web pages or platforms, it will consume even more times of data volume of the user's mobile terminal. And today's high data traffic cost may greatly affect the users' willingness to forward and share online files.

Thus, the file processing operations in existing technologies, while browsing the Internet by mobile terminals, consume a large amount of data volume, which makes it vulnerable to the network access condition and the mobile terminal's hardware quality, and brings inconveniences to users.

BRIEF SUMMARY OF THE DISCLOSURE

For the problems set forth above, the objective of the present invention is to provide a cloud-storage-based file processing method and system, such that the user is not affected by the network access condition and the mobile terminal's hardware quality when performing the file processing operations, such as file uploading and downloading, and to save the user the data volume of the mobile terminal throughout the process.

One aspect of the present disclosure is to provide a cloud-storage-based file processing method. The method includes: receiving a trigger request from a mobile terminal by a cloud server, wherein the trigger request is a cloud processing task request triggered by the mobile terminal; performing, by the cloud server, a corresponding operation according to the trigger request; and when the trigger request is a file uploading request, selecting a file which needs to be uploaded from the cloud server's storage space and transferring the selected file to a target website.

Further, the cloud server receiving a trigger request from the mobile terminal includes: triggering a cloud processing task request through a browser of the mobile terminal. More specifically, the cloud-storage-based file processing method includes: triggering a cloud processing task request through a browser of a mobile terminal; performing, by the cloud server, the corresponding operation according to the trigger request; and when the trigger request is an uploading request, selecting a file from the cloud server's storage space and transferring the selected files to a target website.

Further, when the trigger request is a downloading request, the cloud server downloads a corresponding file from a target website specified in the downloading request and saves the file in the cloud server's cloud storage.

Further, before the cloud server performs the corresponding operations according to the trigger request from the mobile terminal, the method also includes: identifying, by the cloud server, the cloud processing task request submitted by the mobile terminal and determining whether the cloud processing task request is an uploading request or a downloading request.

Further, before the cloud server performs the corresponding operations according to the trigger request from the mobile terminal, the method also includes: performing, by the cloud server, security authentication on the mobile terminal.

Further, the security authentication includes at least one of username, password, and authorization.

Further, when the security authentication is the username, the cloud server determines whether the user logs in the cloud storage account through the mobile terminal. If the user is not logged in, then after the user logs in the cloud storage account, the cloud server carries out the corresponding operation according to the trigger request from the mobile terminal.

Another aspect of the present disclosure provides a cloud-storage-based file processing system. The system includes a mobile terminal and a cloud server. The mobile terminal includes a trigger module configured to trigger a cloud processing task in response to an instruction or an operation from the user.

The cloud server includes a cloud storage module configured to store files; and a cloud uploading module configured to select a file which needs to be uploaded from the files stored in the cloud storage module and to transfer the selected file to a target website when the trigger request is an uploading request.

Further, the cloud server also includes: a cloud downloading module configured to download a corresponding file from a target website specified in the downloading request and to save the file in the cloud storage module when the trigger request is a downloading request.

Further, the cloud server also includes: a task identifying module configured to identify the cloud processing task request triggered by the mobile terminal to determine whether the request is a downloading request or an uploading request.

Further, the cloud server also includes: a security authentication module configured to perform security authentication on the mobile terminal.

Another aspect of the present disclosure provides a cloud-storage-based file processing apparatus. The apparatus includes a receiving module configured to receive a trigger request from a mobile terminal, and the trigger request is a cloud processing task request triggered by the mobile terminal. The apparatus also includes a cloud storage module configured to store files; and a cloud uploading module configured to select a file which needs to be uploaded from files stored in the cloud storage module and to transfer the selected file to a target website when the trigger request is an uploading request.

Further, the apparatus also includes: a cloud downloading module configured to download a corresponding file from a target website specified in the downloading request and to save the file in the cloud storage module when the trigger request is a downloading request.

Further, the apparatus also includes: a task identifying module configured to identify the cloud processing task request triggered by the mobile terminal and to determine whether the cloud processing task request is a downloading request or an uploading request.

Further, the apparatus also includes: a security authentication module configured to perform security authentication on the mobile terminal.

Another aspect of the present disclosure provides a computer-readable storage medium. The computer-readable storage medium stores software applications for executing the cloud-storage-based file processing method disclosed in the present invention.

Using the cloud-storage-based file processing method, apparatus and system according to the present invention, while a mobile terminal is browsing the Internet, the cloud server is used to, on behalf of a user, carry out file downloading and uploading operations using a cloud storage space as a transit or relay. It helps the user completing the online file sharing process, prevents the file uploading and downloading processes from being affected by the network access condition and the mobile terminal's hardware quality, and saves the user the data volume of the mobile terminal throughout the process In order to achieve the above and other related objectives, one or more aspects of the present invention include those features to be described in detail in the followings and particularly pointed out in the claims. The following descriptions and accompanying drawings describe in detail certain illustrative aspects of the present invention. However, these aspects only illustrate some of the ways in which the principle of the present invention can be used. In addition, the present invention intends to include all these aspects and their equivalents.

BRIEF DESCRIPTION OF THE DRAWINGS

The drawings constitute a part of this application and are used to provide further understanding of the present invention. The exemplary embodiments of the present invention are used to explain the present invention and do not limit the present invention. In the drawings.

The same label may be used in all drawings to indicate similar or corresponding feature or function.

DETAILED DESCRIPTION

It should be noted that, when there is no conflict, the disclosed embodiments and features in the embodiments may be combined among one another. The followings, together with accompanying drawings, describe in detail certain embodiments of the present invention.

The term "cloud" as used in the exemplary embodiments of the present invention refers to a data storage, processing, and transferring platform established external to a mobile terminal, also called a "cloud server". A user can establish a communication link to the cloud server through the mobile terminal's browser, and manage the file downloading and file uploading through the cloud server, overcoming the restrictions on data transferring and data storing imposed by the mobile terminal itself, such as hardware quality, data volume and etc.

In order to prevent the file uploading and file downloading process on a mobile terminal from being affected by the network access condition and the hardware quality of the mobile terminal, a user can achieve the file downloading and uploading process by submitting processing instructions to the cloud server. Thus, when the user browses the Internet by the mobile terminal and comes upon a file or a picture which the user wants to forward or share, the user can trigger a downloading task instruction through the mobile terminal's browser to the cloud downloading module in the cloud server. After receiving the instruction, the cloud downloading module downloads the target file from the source file website server (i.e. the target server) and saves the target file to the user's personal cloud storage.

Afterwards, when the user wants to publish the file or the picture on a website, the user triggers a file transferring instruction through the mobile terminal's browser to the cloud uploading module in the cloud server, the cloud uploading module transfers the target file stored in the user's private cloud storage to the target website. Thus, the user achieves the goal of sharing the file found online by the user on a target website or with a person.

Figure 1:
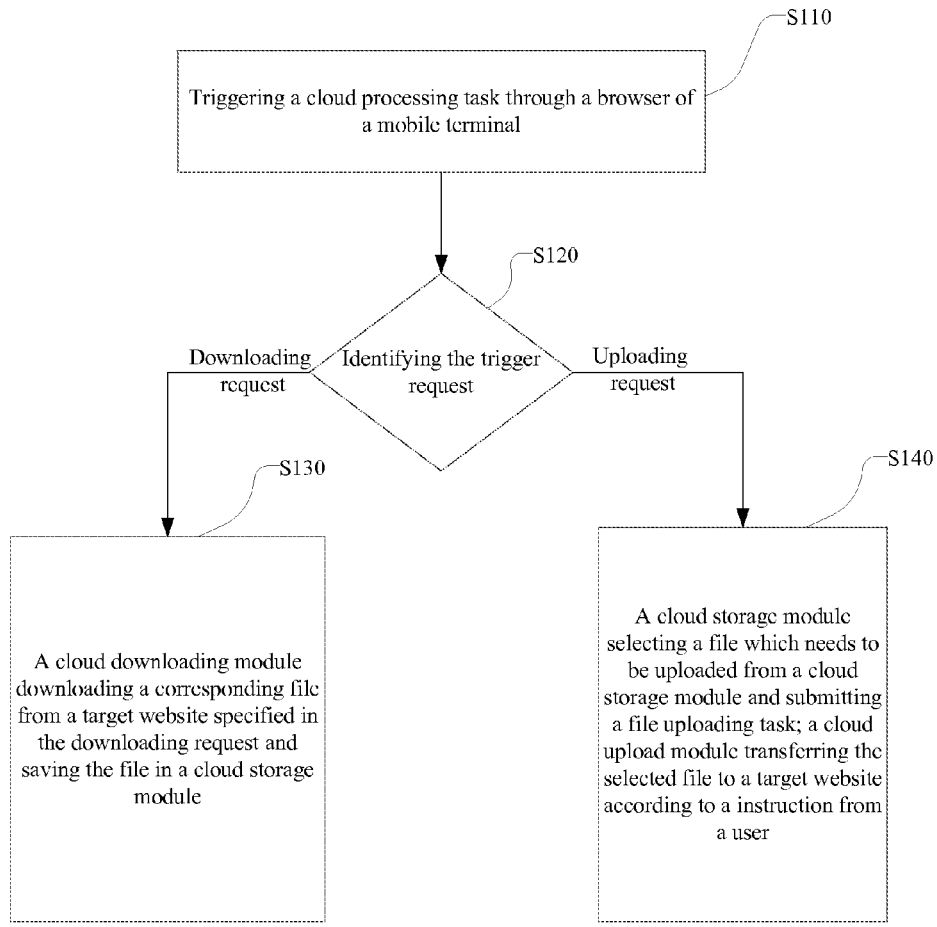
FIG. 1 illustrates a flow chart of an exemplary method for the cloud-storage-based file processing according to an embodiment of the present invention.

FIG. 1 illustrates a flow chart of an exemplary method for the cloud-storage-based file processing according to an embodiment of the present invention.

As shown in FIG. 1, while browsing webpages using a mobile terminal, if a user wants to forward and share a file or a picture, the user triggers a cloud downloading/uploading operation task through the mobile terminal's browser (Step S110). According to the user's trigger request, the cloud server carries out the corresponding operation(s). First, the cloud server determines whether the trigger request is a downloading request or an uploading request (Step S120). If the trigger request is a downloading request, the cloud downloading module in the cloud server downloads a corresponding file from a target website specified in the downloading request and stores the file in a cloud storage (Step S130). If it is an uploading request, the cloud server selects the file which needs to be uploaded from its cloud storage module and submits a file uploading task, then the cloud uploading module in the cloud server follows the user's instruction and transfers the specified file to the target website server (Step S140).

According to the embodiments of present invention, the cloud-storage-based file processing system can be implemented in a client/server (C/S) architecture, with the mobile terminal as the client side, providing a platform for a user to trigger the cloud downloading/uploading process operations, and with the cloud server as the server side, carrying out the corresponding downloading, uploading and storing operations according to the cloud processing tasks triggered by the user.

Figure 2:
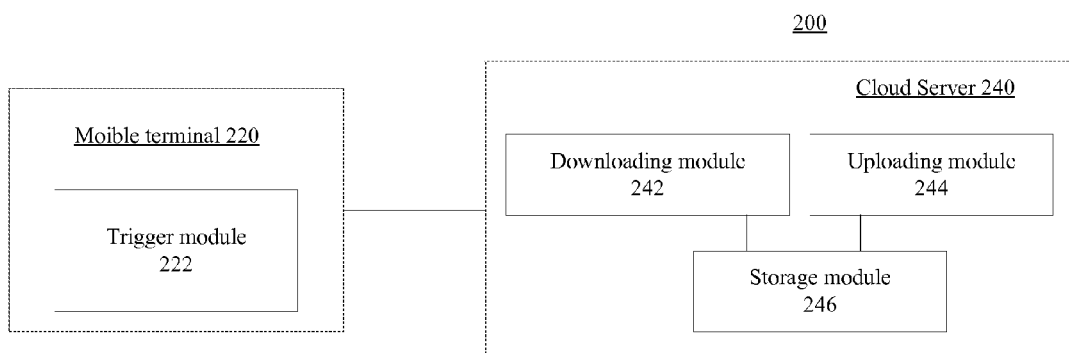
FIG. 2 illustrates a block diagram of an exemplary system for the cloud-storage-based file processing according to an embodiment of the present invention.

Accordingly, as shown in FIG. 2, the cloud-storage-based file processing system 200 includes a mobile terminal 220 and a cloud server 240, and the mobile terminal 220 includes a trigger module 222. The trigger module 222 is configured to trigger cloud a processing task in response to a user's instructions. The cloud server 240 includes a cloud downloading module 242, a cloud uploading module 244, and a cloud storage module 246. The cloud downloading module 242, the cloud uploading module 244, and the cloud storage module 246 are configured respectively to perform the corresponding file downloading, uploading, and storing operations according to the cloud processing tasks submitted through the mobile terminal.

When the user issues a file downloading instruction or request (trigger a cloud processing task request or a trigger request) through the mobile terminal's trigger module 222, the cloud downloading module 242 in the cloud server, according to the user's file downloading instruction, downloads the specified file from a target website, then the cloud storage module 246 stores the file in the cloud storage. When the user issues a file uploading instruction through the mobile terminal's trigger module 222, the cloud uploading module 244 in the cloud server transfers the specified file from the cloud storage to a target website according to the user's file uploading instruction.

The cloud server can also include a task identifying module (not shown in the drawings) configured to identify the cloud processing task submitted by the mobile terminal and to determine whether the task is a downloading request task or an uploading request task, so that the corresponding cloud downloading module or the cloud uploading module can be called to perform the corresponding processing operations. More specifically, when the task identifying module determines that the requested cloud processing task submitted by the mobile terminal is a downloading request task, the cloud downloading module is called to perform the corresponding operation. When the task identifying module determines that the requested cloud processing task submitted by the mobile terminal is an uploading request task, the cloud uploading module is called to perform the corresponding operation.

For the security and management of data transferring, the cloud server can also includes a security authentication module (not shown), so that the security authentication operations, such as user logon, password authentication, authorization, etc., can be performed when a user triggers a data processing task (e.g., downloading or uploading a file) by the cloud server.

Figure 3:
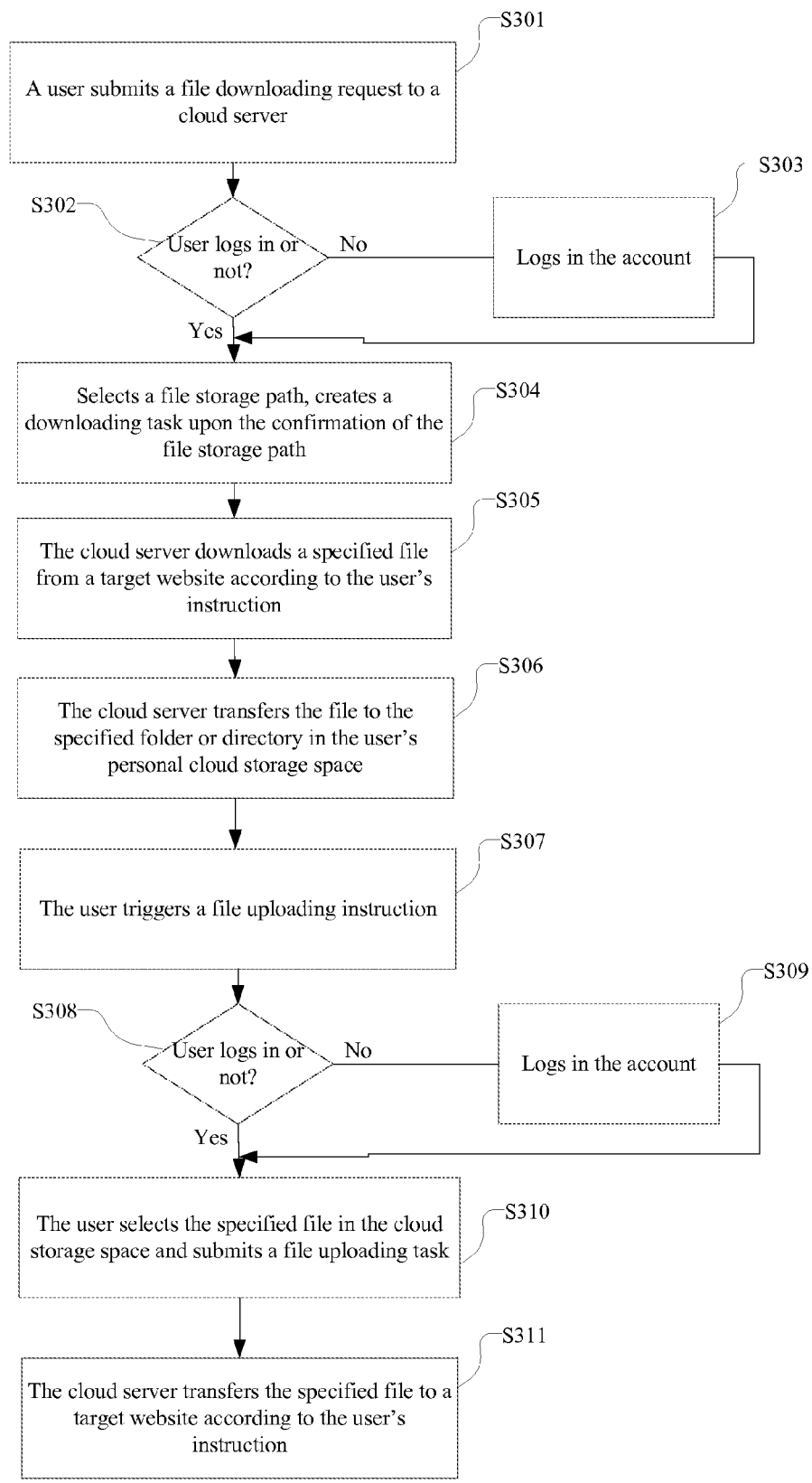
FIG. 3 illustrates a flow chart of a mobile terminal user forwarding and sharing online files while browsing Internet websites according to an embodiment of the present invention.

As an example, the flow chart of a process for forwarding and sharing files or pictures while browsing webpages using a mobile terminal is shown in FIG. 3:

STEP S301: while browsing webpages through the mobile terminal's browser, the user selects a webpage image or a downloadable link and submits a file downloading request to the cloud server.

STEP S302: the cloud server determines whether the user logs in the user's cloud storage account. If the user is not logged in, the process goes to STEP S303. If the user already logged in the cloud storage account, the process goes to STEP S304.

STEP S303: the user logs in the user's cloud storage account.

STEP S304: after the user logs in the user's cloud storage account, the user selects a file storage path and creates a downloading task upon the confirmation of the file storage path.

STEP S305: according to the user's instruction, the cloud downloading module in the cloud server downloads the specified file from the target server to the cloud server.

STEP S306: the cloud storage module in the cloud server transfers the file to the specified folder or directory in the user's personal cloud storage space.

STEP S307: when the user publishes posts on a forum website, writes emails or writes blogs through the mobile terminal, the user triggers a file uploading request through uploading control from the mobile terminal's browser.

STEP S308: the cloud server determines if the user logs in the user's cloud storage account. If the user is not logged in, the process goes to STEP S309. If the user is logged in, the process goes to STEP S310.

STEP S309: the user logs in the user's cloud storage account.

STEP S310: after the user logs in the user's storage account, the user selects the specified file in the cloud storage and submits a file uploading task.

STEP S311: the cloud uploading module in the cloud server, according to the user's instruction or request, transfers the specified files to the target website server.

It is to be noted that, for all the steps illustrated in FIG. 3, steps from S301 to S306 and steps from S307 to S311 can be performed completely as an entire embodiment, or can be performed separately and independently. For example, when only downloading tasks are needed to be performed, only steps from STEP S301 to STEP S306 may be performed. When only file uploading tasks are needed to be performed, only steps from STEP S307 to STEP S311 may be required to be performed.

Preferably, the user's downloading process and uploading process can be carried out at different time. For example, the user can issue file downloading requests at any time to the cloud downloading module in the cloud server to download any Internet documents while browsing webpages, and can save the documents in the user's personal cloud storage space. Whenever the user wants to upload files, the user transfers the files from the user's personal cloud storage space to the target website server through the cloud storage module in the cloud server.

As described in the flow chart above, by using the cloud-storage-based file processing method and system disclosed in the embodiments of the present invention to download and upload files, while browsing the Internet on the mobile terminal, the user can use the user's cloud storage space as a transit or relay, and uses a cloud server on behalf of the user to complete the file downloading and uploading. The user can be helped in carrying out online file sharing, preventing the file downloading and uploading process from being affected by the mobile terminal's network access condition and its hardware quality, and saving the user data volume of the mobile terminal throughout the process.

In the following, an application example is provided to describe in detail the cloud-storage-based file processing method and system disclosed in an embodiment of the present invention.

While a user is visiting an official forum website through a mobile terminal's browser, the user discovers that a pre-release of a new version browser is first published at this website. In order to let more users to experience the new functions of this browser in the first place, the user wants to share the browser's installation package published on the official forum website with users from Symbian Discussion Forum Website. The user navigates to the dedicated browser publishing page in the official forum website, selects the attachment on the official forum website and clicks on the offline-download button from the mobile terminal's browser menu. Because the user already logged in the user's cloud storage account beforehand, the webpage jumps to the offline-download confirmation page where the user can view all file related information such as file name, file size, etc.; and the user selects a saving folder in the cloud storage space or netdisk and submits a downloading task. The cloud downloading module in the cloud server, according to the user submitted downloading task, downloads the file from the website server of the official forum website and saves the file in the user's cloud storage netdisk. Because the entire file downloading operation is carried out by the cloud server instead, there is no data volume occurred on the mobile terminal in the process.

Next the user logs on the Symbian Discussion Form website, and selects uploading attachment after filling in the title and the content of a web post. From a pop-up window, the user further chooses uploading through the cloud storage netdisk, then selects the installation package for the new version browser stored in the cloud storage netdisk. After confirmation, the selected file shows up in the dialog box for file uploading. After the user clicks on the posting discussion button, the cloud uploading module in the cloud server transfers the user selected file to the Symbian Discussion Forum website and accomplishes the post publishing.

The above describes the exemplary cloud-storage-based file processing method and system in reference to the accompanying drawings. The above are only preferred embodiments of the present invention and are not intended to limit the present invention. To those skilled in the art, the present invention may have various modifications and changes. Within the spirit and principles of the present invention, any modification, equivalent replacement, improvement, etc., should be included in the scope of the present invention.

What is claimed is:

1. A cloud-storage-based file processing method, comprising:
receiving, by a cloud server, a trigger request from a mobile terminal, wherein the trigger request is a cloud processing task request triggered by a webpage displayed in a browser of the mobile terminal;
identifying, by the cloud server, the cloud processing task request;
determining whether the cloud processing task request is a downloading request for downloading a corresponding file from a down-load target website to the cloud server's cloud storage space, or an uploading request for uploading a corresponding file from the cloud server's cloud storage space to an upload-target website;
when the trigger request is a downloading request from the mobile terminal,
jumping, by the browser, from the webpage to a download confirmation page where the user views related information of the corresponding file to be downloaded and selects a saving folder in the cloud server's cloud storage space,
downloading, by the cloud server, a corresponding file from the download-target website specified in the downloading request, and
saving, by the cloud server, the corresponding file to the saving folder in the cloud server's cloud storage space without saving the corresponding file locally on the mobile terminal,
wherein the download-target website is hosted on a server other than the cloud server; and
when the trigger request is an uploading request from the mobile terminal,
selecting, by the mobile terminal, a file to be uploaded from the cloud server's cloud storage space, wherein the selected file is the corresponding file from the download-target website specified in the downloading request and saved by the cloud server, and
transferring, by the cloud server, the selected file to the upload-target website specified in the uploading request, wherein the upload-target website is hosted on a server other than the cloud server.

2. The cloud-storage-based file processing method according to claim 1, wherein, before the cloud server performing the corresponding operations according to the trigger request, the method further includes:
performing, by the cloud server, security authentication on the mobile terminal.

3. The cloud-storage-based file processing method according to claim 2, wherein:
the security authentication includes at least one of username, password, and authorization.

4. The cloud-storage-based file processing method according to claim 3, wherein:
when the security authentication is the username, determining, by the cloud server, whether a user of the mobile terminal is logged in a cloud storage account;
when the user is not logged in the cloud storage account, performing, by the cloud server, the corresponding operation according to the trigger request after the user logs in the cloud storage account.

5. The cloud-storage-based file processing method according to claim 2, the security authentication further comprising:
after the cloud server receives the trigger request and before the cloud server performs the corresponding operations according to the trigger request, determining, by the cloud server, whether a user logs in a cloud storage account of the user;
when the user is not logged in, a browser of the mobile terminal prompts the user to input login information; and
authenticating, by the cloud server, the inputted login information.

6. The cloud-storage-based file processing method according to claim 5, wherein:
the downloading request is triggered through the browser of the mobile terminal when the user is visiting the download-target website;
the corresponding file specified in the download request is saved in the cloud server's cloud storage space associated with the cloud storage account of the user;
the uploading request is triggered through the browser of the mobile terminal when the user is visiting the upload-target website; and the file to be uploaded is selected from the cloud server's cloud storage space associated with the cloud storage account of the user.

7. The cloud-storage-based file processing method according to claim 1, wherein:
when a user uses the browser to navigate a webpage on the download-target website, select an element on the webpage and click a download button provided by a menu of the browser, the downloading request is triggered.

8. The cloud-storage-based file processing method according to claim 1, wherein:
when a user of the mobile terminal selects to upload an attachment at the upload-target website and chooses to upload through the cloud storage space, the uploading request is triggered.

9. The cloud-storage-based file processing method according to claim 1, wherein:
the corresponding file from the download-target website specified in the downloading request is a file or a picture from a forum website; and
according to the downloading request, the cloud server downloads the corresponding file from the forum website.

10. A cloud-storage-based file processing system, comprising:
a mobile terminal; and
a cloud server,
wherein:
the mobile terminal includes a request trigger module configured to trigger a cloud processing task by a trigger request in response to an instruction from a user through a webpage displayed in a browser of the mobile terminal;
the cloud server includes:
a cloud storage module configured to store files;
a task identifying module configured to identify the cloud processing task request triggered by the mobile terminal to determine whether the cloud processing task request is a downloading request for downloading a corresponding file form a down-load target website to the cloud server's cloud storage space, or an uploading request for uploading a corresponding file from the cloud server's cloud storage space to an upload-target website;
a cloud download module configured to, when the trigger request is a downloading request from the mobile terminal,
send an instruction to the browser of the mobile terminal to jump from the webpage to a download confirmation page where the user views related information of the corresponding file to be downloaded and selects a saving folder in the cloud server's cloud storage space,
download the corresponding file from the download-target website specified in the downloading request, and
save the corresponding file to the saving folder in the cloud storage module without saving the corresponding file locally on the mobile terminal,
wherein the download-target website is hosted on a server other than the cloud server; and
a cloud uploading module configured to, when the trigger request is an uploading request from the mobile terminal,
select a file to be uploaded specified in the uploading request from the files saved in the cloud storage module, wherein the selected file is the corresponding file from the download-target website specified in the downloading request and saved in the cloud storage module, and
transfer the selected file to the upload-target website specified in the uploading request, wherein the upload-target website is hosted on a server other than the cloud server.

11. The cloud-storage-based file processing system according to claim 10, wherein the cloud server also includes:
a security authentication module configured to perform security authentication on the mobile terminal.

12. A cloud-storage-based file processing apparatus used in a cloud server, comprising:
a receiving module configured to receive a trigger request from a mobile terminal, wherein the trigger request is a cloud processing task request triggered by the mobile terminal through a webpage displayed in a browser of the mobile terminal;
a cloud storage module configured to store files;
a task identifying module configured to identify the cloud processing task request triggered by the mobile terminal to determine whether the cloud processing task request is a downloading request for downloading a corresponding file form a down-load target website to the cloud server's cloud storage space, or an uploading request for uploading a corresponding file from the cloud server's cloud storage space to an upload-target website;
a cloud download module configured to, when the trigger request is a downloading request from the mobile terminal,
send an instruction to the browser of the mobile terminal to jump from the webpage to a download confirmation page where the user views related information of the corresponding file to be downloaded and selects a saving folder in the cloud server's cloud storage space,
download the corresponding file from the download-target website specified in the downloading request, and
save the corresponding file to the saving folder in the cloud storage module without saving the corresponding file locally on the mobile terminal,
wherein the download-target website is hosted on a server other than the cloud server; and
a cloud uploading module configured to, when the trigger request is an uploading request from the mobile terminal,
select a file to be uploaded specified in the uploading request from the files saved in the cloud storage module,
wherein the selected file is the corresponding file from the download-target website specified in the downloading request and saved in the cloud storage module, and
transfer the selected file to the upload-target website specified in the uploading request, wherein the upload-target website is hosted on a server other than the cloud server.

13. The cloud-storage-based file processing apparatus according to claim 12, further including:
a security authentication module configured to perform security authentication on the mobile terminal.

14. A non-transitory computer-readable storage medium, wherein the non-transitory computer-readable storage medium stores software applications for executing a cloud-storage-based file processing method, the method comprising:

receiving, by a cloud server, a trigger request from a mobile terminal, wherein the trigger request is a cloud processing task request triggered by a webpage displayed in a browser of the mobile terminal;

identifying, by the cloud server, the cloud processing task request;

determining whether the cloud processing task request is a downloading request for downloading a corresponding file form a down-load target website to the cloud server's cloud storage space, or an uploading request for uploading a corresponding file from the cloud server's cloud storage space to an upload-target website;

when the trigger request is a downloading request from the mobile terminal, jumping, by the browser, from the webpage to a download confirmation page where the user views related information of the corresponding file to be downloaded and selects a saving folder in the cloud server's cloud storage space, downloading, by the cloud server, a corresponding file from the download-target website specified in the downloading request, and saving, by the cloud server, the corresponding file to the saving folder in the cloud server's cloud storage space without saving the corresponding file locally on the mobile terminal, wherein the download-target website is hosted on a server other than the cloud server; and when the trigger request is an uploading request from the mobile terminal, selecting, by the mobile terminal, a file to be uploaded from the cloud server's cloud storage space, wherein the selected file is the corresponding file from the download-target website specified in the downloading request and saved by the cloud server, and transferring, by the cloud server, the selected file to the upload-target website specified in the uploading request, wherein the upload-target website is hosted on a server other than the cloud server.

15. The non-transitory computer-readable storage medium according to claim 14, wherein, before the cloud server performing the corresponding operations according to the trigger request, the method further includes:

performing, by the cloud server, security authentication on the mobile terminal.

\* \* \* \* \*